(12) United States Patent
Rozzi et al.

(10) Patent No.: US 8,042,995 B2
(45) Date of Patent: Oct. 25, 2011

(54) METHOD FOR MONITORING TEMPERATURE OF COMPUTER COMPONENTS TO DETERMINE AMBIENT CHASSIS TEMPERATURE

(75) Inventors: James A. Rozzi, Houston, TX (US); Montgomery C. McGraw, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 758 days.

(21) Appl. No.: 12/155,606

(22) Filed: Jun. 6, 2008

(65) Prior Publication Data
US 2008/0304233 A1 Dec. 11, 2008

Related U.S. Application Data

(60) Provisional application No. 60/942,496, filed on Jun. 7, 2007.

(51) Int. Cl.
*G01K 1/00* (2006.01)
(52) U.S. Cl. ......................... 374/100; 374/141
(58) Field of Classification Search .................. 374/100, 374/120, 134, 141, 163
See application file for complete search history.

(56) References Cited

U.S. PATENT DOCUMENTS

| | | | | |
|---|---|---|---|---|
| 6,573,704 B2* | 6/2003 | Mirov | ............................ | 374/141 |
| 6,880,970 B2* | 4/2005 | Mirov | ............................ | 374/208 |
| 7,698,023 B2* | 4/2010 | Barry et al. | ................... | 700/300 |
| 2002/0080852 A1* | 6/2002 | Mirov | ............................ | 374/208 |
| 2005/0099631 A1* | 5/2005 | Yu | ................................. | 374/141 |
| 2009/0168835 A1* | 7/2009 | Heinke et al. | ................. | 374/121 |
| 2009/0175311 A1* | 7/2009 | Xin et al. | ......................... | 374/45 |
| 2010/0145271 A1* | 6/2010 | Hartlaub et al. | ............... | 374/45 |
| 2010/0198546 A1* | 8/2010 | Kamata | .......................... | 374/143 |

* cited by examiner

*Primary Examiner* — Brad Bennett

(57) ABSTRACT

A computer-implemented method for monitoring temperature of a blade server to determine ambient temperature includes the steps of determining temperatures of each of any installed processing components, and determining a temperature of an administrator component. If there are no processing components installed in the computer chassis, the method reports the ambient temperature as the temperature of the administrator component, and if there are processing components installed in the computer chassis, the method reports the highest temperature value of a processing component which is lower than the temperature value of the administrator module as the ambient temperature.

8 Claims, 3 Drawing Sheets

METHOD FOR MONITORING TEMPERATURE OF COMPUTER COMPONENTS TO DETERMINE AMBIENT CHASSIS TEMPERATURE

CROSS REFERENCE TO RELATED APPLICATIONS

This application claims priority from U.S. Provisional Application 60/942,496 filed Jun. 7, 2007 entitled "METHOD OF MONITORING TEMPERATURE OF BLADE SERVERS TO DETERMINE AMBIENT CHASSIS TEMPERATURE," the content of which is incorporated herein in its entirety to the extent that it is consistent with this invention and application.

BACKGROUND

Computer system administrators and users often are concerned with their computer system's general performance rather than specific details. Users have trouble interpreting the information when presented with a dozen different power ratings, temperatures, fan speeds, etc. Users often want a single number that can be monitored, often over time, to determine if their computer system is in need of attention. In a computer system, one such "number" is the ambient temperature value.

Blade servers are common forms of a computer system. Blade servers include enclosures to house one or more processor blades, storage blades, or other components. Operating the blade server can generate significant amounts of heat. Thus, blade enclosures and the components included therein frequently have associated a thermal management system. This thermal management system may employ many different temperature sensors. Further, different modules may report temperatures in different ways. Some sensors report temperatures in degrees Fahrenheit, others in degrees Celsius, and others may report relative temperatures, for example: "cool," "warm," "hot," or "critical."

Blade enclosures do not have an ambient temperature sensors built into the enclosure. This is because ambient temperature is too vague to have actual application in thermal management of the enclosure. Accurate thermal management requires precise measurements at critical locations within the enclosure and its modules.

Further, placing an enclosure ambient temperature sensor in a convenient location raises a number of problems. For instance, placing a temperature sensor on one of the enclosure's backplanes may seem an obvious choice. The backplanes contain power and communications capabilities and would not requiring additional cabling or mounting options for the sensor. The problem with this location is that backplanes are located behind the blades, which are significant sources of heat. This location choice would cause a backplane mounted ambient temperature sensor to read much higher than the actual enclosure ambient temperature.

To report an ambient temperature to the user, the ambient temperature must be computed from other sensors in the enclosure. Averaging temperatures of all sensors could possibly mask hot-spots in the enclosure and therefore is not a desirable method of computing an ambient temperature.

In current blade enclosures, ambient temperature often is reported as the temperature sensed in an administrator module. The administrator module in these previous enclosures often is located at the rear of the enclosure, where air flowing over the sensor is pre-heated by the blades located at the front of the enclosure. This results in ambient temperatures being reported that are higher than the enclosure's actual ambient temperature.

SUMMARY

What is disclosed is a computer-implemented method for monitoring temperatures of computer components in a computer enclosure, the components including zero, one, or more processing components, and an administrator component, to determine ambient chassis temperature. The method includes the steps of determining temperatures of each of the processing components; determining a temperature of the administrator component; if there are no processing components installed in the computer chassis, reporting the ambient temperature as the temperature of the administrator component; and if there are processing components installed in the computer chassis, reporting the highest temperature value of a processing component which is lower than the temperature value of the administrator module as the ambient temperature.

DESCRIPTION OF THE DRAWINGS

The detailed description will refer to the following drawings, in which like numerals refer to like elements, and in which.

DETAILED DESCRIPTION

Figure 1:
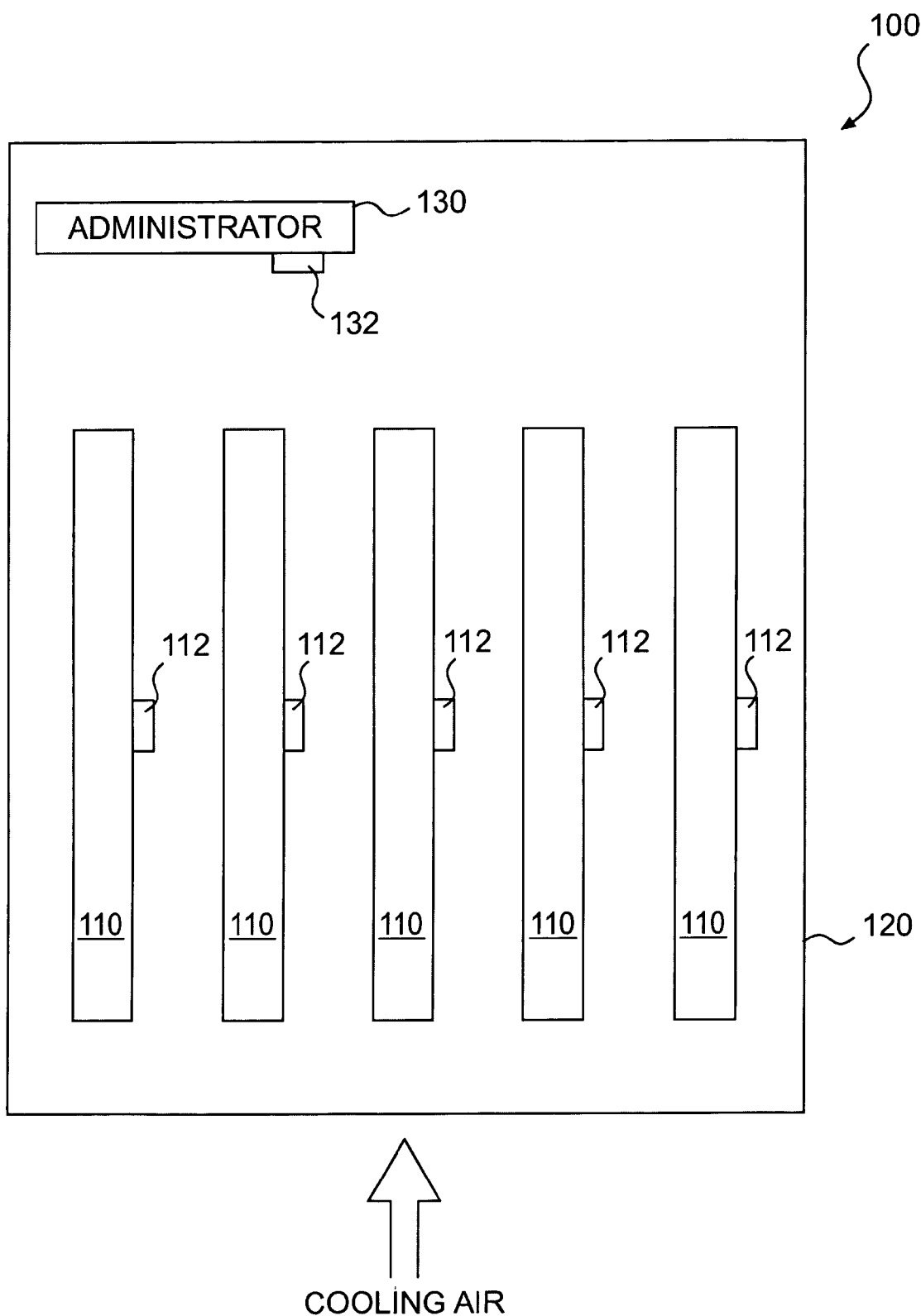
FIG. 1 is a simplified rendition of an exemplary blade server having an exemplary ambient temperature monitoring system.

Any computer system, when operating, generates heat that must be removed to avoid damage to the computer system's components. In some of these computer systems, measurement and monitoring of computer system components is part of an overall thermal management program. Blade servers are an example of such a computer system. Blade servers generally comprise a number of blades mounted in an enclosure or chassis. A simplified rendition of such a blade server is shown in FIG. 1. Server 100 includes processor blades 110 mounted in enclosure 120. Associated with each blade 110 is a blade temperature monitor 112. Also shown in FIG. 1 is administrator module 130, which includes temperature monitor 132. Each of the temperature monitors 112, 132 can measure, or determine, the ambient temperature of its associated component. Cooling air is supplied to the blade server 100 and passes over and around components (e.g., the blades 110 and the administrator module 130) of the server 100 in order to cool those components.

The arrangement of the temperature monitor 132 and the temperature monitors 112 within the enclosure 120 is such that the temperature measured by the temperature monitor 132 tends to be different (e.g., hotter) than the temperatures measured by the temperature monitors 112. This is because, as shown in FIG. 1, cooling air supplied to the server 100 passes over the temperature monitors 112 before substantial heating of the air occurs, whereas the cooling air flowing over the temperature monitor 132 has been heated by passage over the other components (e.g., the blades 110) of the server 100. In addition, the temperature sensor 132 is located within the enclosure 120 where the temperature sensor 132 may be heated by components that are adjacent to the administrator module 130.

Although the blade server 100 of FIG. 1 shows a blade enclosure having a specific number of installed blades, the number of blades is not so limited. In addition, the blade server 100 may include a number of slots, or bays, that are empty (no blade installed or may contain other components, including storage blades).

Figure 2:
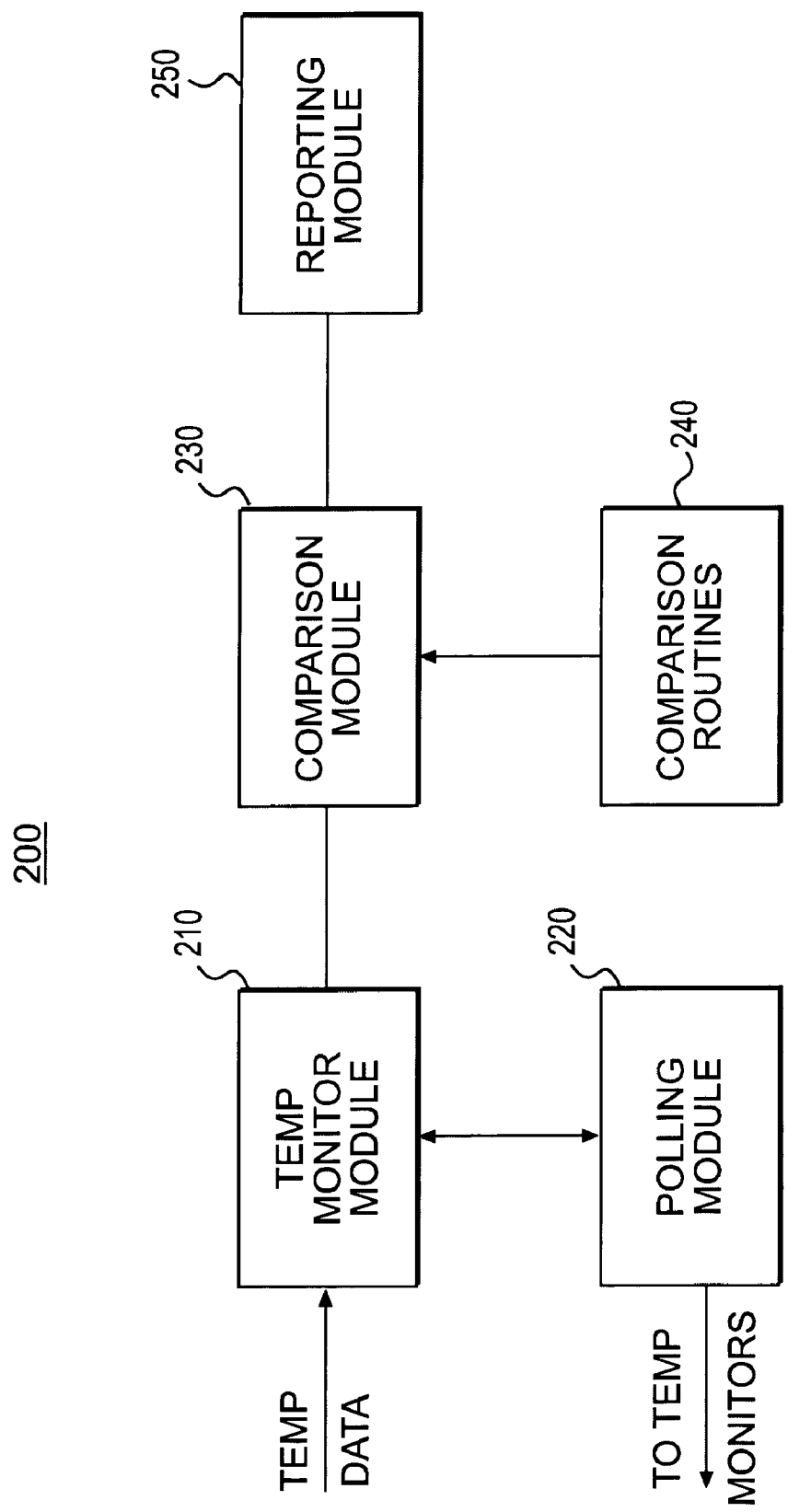
FIG. 2 is a block diagram of an exemplary ambient temperature program used with the blade server of FIG. 1.

FIG. 2 is a block diagram illustrating an exemplary thermal management program 200 that may be used with the blade server 100 of FIG. 1. The program 200 includes a temperature monitor module 210 that receives data indicative of component temperature for each temperature monitor (e.g., the temperature monitors 112 and 132) installed and active on the blade server 100. A polling module 220 may be used to retrieve the temperature data from each temperature monitor. For example, the polling module 220 may query each temperature monitor on a periodic basis. A comparison module 230 invokes various comparison routines 240 to compare the temperature data received at the monitor module 210. For example, one such routine 240 may compare the temperature data received from the temperature monitor 132 with the temperature data received from each of the temperature monitors 112. This routine 240 uses the comparison to determine with of the temperature data corresponds to a highest temperature. Finally, a reporting module 250 reports the results of any comparisons, and the corresponding temperature. Such report may be provided electronically to blade server administrators (humans), or to a larger monitoring system (electronic). The report may also be used to energize an alarm or warning feature, or to activate additional blade cooling, for example. The report also may be provided in hard copy (printed) form, and may be stored in a database used to support trend analysis, or similar functions.

Figure 3:
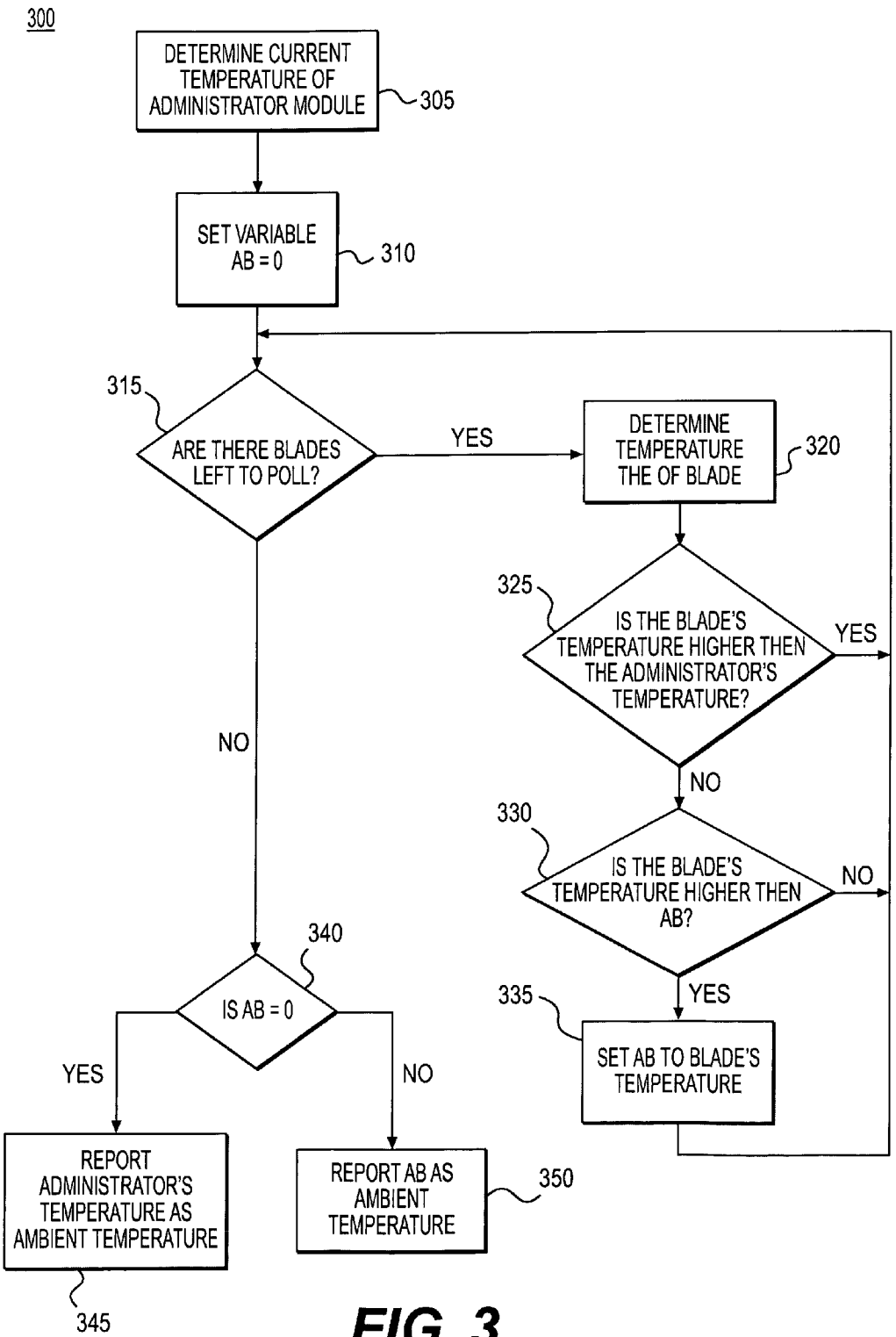
FIG. 3 is a flow diagram showing an exemplary computer-implemented method for determining ambient temperature of a blade server.

FIG. 3 is a flowchart illustrating an exemplary computer-implemented method 300 for determining ambient chassis temperature of a blade server, such as the blade server 100 of FIG. 1.

The method 300 begins, in block 305, when the thermal management program 200 receives a temperature reading from the temperature monitor 132 located on the administrator module 130. Note that reception of this temperature data may be in response to a polling operation. In block 310, the program 200 sets the variable AB to zero. Next, in block 315, the program 200 determines if there are any blades 110 to poll. If there are blades 110 to poll, the program 200 proceeds to block 320 and determines the temperature of the next blade 110. In block 325, the program 200 determines if the temperature of the blade whose temperature was just recorded is higher that the temperature of the temperature monitor 132 (i.e., determined in block 305). If the temperature of the blade 110 is higher than the temperature determined in block 305, the program 200 returns to block 315. If the temperature of the blade is not higher than that recorded in block 305, the program 200 proceeds to block 330.

In block 330, the program 200 compares the temperature determined in block 320 to the value of the variable AB. If the temperature determined in block 320 is not greater than the value of the variable AB, the program 200 returns to block 315. Otherwise, the program 200 proceeds to block 335. In block 335, the program 200 sets the value of the variable AB to the blade's temperature (i.e., to the temperature determined in block 320). The program 200 then returns to block 315.

In block 315, if there are no more blades 110 to poll for temperature data, the program 200 moves to block 340, and determines if the value of the variable AB is zero. If the variable AB is set to zero, the program 200 moves to block 345 and reports the temperature determined in block 305 as the ambient temperature of the blade server 100. If, in block 340, the variable AB is not set to zero, the program 200 moves to block 350 and reports the value of AB as the ambient temperature of the blade server 100.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated. In particular, although the above description refers to temperature monitoring in a blade server, the disclosed method is equally applicable to monitoring any computer system or similar system. Furthermore, the above-disclosed method may be implemented on a general purpose computer, a stand-alone computer, as part of a blade server administrator module, or may be implemented on a computer-readable medium including, for example, an optical disk or a hard drive.

What is claimed is:

1. A computer-implemented method for monitoring temperatures of computer components in a computer enclosure, the components including zero, one, or more processing components, and an administrator component, to determine ambient temperature, the method, comprising:

determining temperatures of each of the processing components;

determining a temperature of the administrator component;

if there are no processing components installed in the computer chassis, reporting the ambient temperature as the temperature of the administrator component; and if there are processing components installed in the computer chassis, reporting the highest temperature value of a processing component which is lower than the temperature value of the administrator module as the ambient temperature.

2. The method of claim 1, wherein said computer system is a blade system, and wherein the processing components are server blades.

3. The method of claim 1, wherein determining temperatures of each of the processing components comprises polling each of the processing components.

4. The method of claim 3, wherein determining the temperature of the administrator component comprises polling the administrator component.

5. The method of claim 4, wherein the polling is executed periodically.

6. The method of claim 1, further comprising using the reported temperature for alarm and warning purposes.

7. A computer-implemented method for monitoring temperatures in a blade server to determine ambient temperature, comprising:

(a) determining a temperature of an administrator module in the blade server;

(b) setting a variable AB to zero;

(c) determining if the blade server includes any blades to poll for temperature data;

(d) if the blade server includes any blades to poll for temperature data, determining a blade with a highest temperature value;

(e) if the highest blade temperature is higher than the variable AB, setting the variable AB to the highest blade temperature;

(f) determining if the variable AB is set to zero;

(g) if the variable AB is set to zero, reporting the ambient temperature as the temperature determined in step (a); and (h) if the variable AB is not set to zero, reporting the value of the variable AB as the ambient temperature.

8. A computer readable media comprising computer code for implementing a method for monitoring temperatures in a blade server to determine ambient temperature, comprising:

(a) determining a temperature of an administrator module in the blade server;

(b) setting a variable AB to zero;

(c) determining if the blade server includes any blades to poll for temperature data;

(d) if the blade server includes any blades to poll for temperature data, determining a blade with a highest temperature value;

(e) if the highest blade temperature is higher than the variable AB, setting the variable AB to the highest blade temperature;

(f) determining if the variable AB is set to zero;

(g) if the variable AB is set to zero, reporting the ambient temperature as the temperature determined in step (a); and (h) if the variable AB is not set to zero, reporting the value of the variable AB as the ambient temperature.

* * * * *